(12) United States Patent
Möglich

(10) Patent No.: US 11,484,978 B2
(45) Date of Patent: Nov. 1, 2022

(54) ELECTRICALLY INSULATED LOCKING ELEMENT

(71) Applicant: Hilti Aktiengesellschaft, Schaan (LI)

(72) Inventor: Tobias Möglich, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 229 days.

(21) Appl. No.: 16/638,739

(22) PCT Filed: Aug. 10, 2018

(86) PCT No.: PCT/EP2018/071713
§ 371 (c)(1),
(2) Date: Feb. 12, 2020

(87) PCT Pub. No.: WO2019/034541
PCT Pub. Date: Feb. 21, 2019

(65) Prior Publication Data
US 2021/0129277 A1   May 6, 2021

(30) Foreign Application Priority Data
Aug. 18, 2017   (EP) ..................................... 17186769

(51) Int. Cl.
*B23Q 11/00*  (2006.01)
*B23Q 1/70*   (2006.01)
*B23Q 3/12*   (2006.01)

(52) U.S. Cl.
CPC .............. *B23Q 1/703* (2013.01); *B23Q 3/12* (2013.01); *B23Q 11/0078* (2013.01)

(58) Field of Classification Search
CPC ...... B23Q 1/703; B23Q 3/12; B23Q 11/0078; B23Q 5/20; Y10T 409/309352;
(Continued)

(56) References Cited

U.S. PATENT DOCUMENTS 3,121,813 A * 2/1964 Pratt .................... B25F 5/02
                                                    310/43
3,785,443 A   1/1974 Armbruster
(Continued)

FOREIGN PATENT DOCUMENTS

DE   2122582 A1   11/1972
DE   2158118 A1   5/1973
WO   WO8501089 A1   3/1985

OTHER PUBLICATIONS

International Search Report of PCT/EP2018/071713, dated Oct. 22, 2018.

*Primary Examiner* — Chwen-Wei Su
(74) *Attorney, Agent, or Firm* — Davidson, Davidson & Kappel, LLC

(57) ABSTRACT

A machine tool having a tool holder for exchangeably holding a tool is provided, the machine tool including: a machine tool housing; a spindle rotatably mounted in the machine tool housing a drive end being connected to a drive for rotating the spindle about an axis of rotation and a holding end being coupled to the tool holder; and a locking device arranged in the machine tool housing and which has a locking element reversibly movable between a release position and a locking position, a locking end of the locking element having an interlocking connector and the spindle having a mating interlocking connector, the interlocking connector being disengaged from the mating interlocking connector in the release position to enable rotational motion of the spindle, and the interlocking connector being engaged with the mating interlocking connector in the locking position to prevent rotational motion of the spindle and to enable an exchange of the tool of the tool holder, the locking device also including an electrically insulating mounting device for mounting the locking element in the machine tool housing to (Continued)

electrically insulate the locking element from the machine tool housing.

19 Claims, 2 Drawing Sheets

(58) Field of Classification Search
CPC . B24B 23/022; B23B 31/107; B23B 31/1072; B23B 31/10741
See application file for complete search history.

(56) References Cited

U.S. PATENT DOCUMENTS

| | | | |
|---|---|---|---|
| 3,834,468 A | 9/1974 | Hettich et al. | |
| 5,049,013 A * | 9/1991 | Engles | B01F 35/31 409/231 |
| 5,143,490 A * | 9/1992 | Kopras | B23C 5/10 407/54 |
| 8,047,242 B2 * | 11/2011 | Wall | B25F 5/001 408/710 |
| 9,522,465 B2 * | 12/2016 | Yeoh | F16B 35/00 |
| 9,669,534 B2 * | 6/2017 | Okouchi | B25F 5/008 |

\* cited by examiner

ELECTRICALLY INSULATED LOCKING ELEMENT

The present invention relates to a machine tool comprising a tool holder for exchangeably holding a tool.

More specifically, the present invention relates to a machine tool comprising a tool holder for exchangeably holding a tool, the machine tool comprising a machine tool housing, a spindle which is rotatably mounted in the machine tool housing and has a drive end and a holding end, and a locking device which is mounted in the machine tool housing and has a locking element. The drive end of the spindle is connected to a drive for rotating the spindle about an axis of rotation and the holding end of the spindle is coupled to the tool holder. The locking element has a locking end for interacting with the spindle and has an actuation end, the locking element being reversibly movable between a release position and a locking position. The locking end of the locking element has at least one interlocking connection means and the spindle has at least one mating interlocking connection means, the at least one interlocking connection means of the locking element being disengaged from the at least one mating interlocking connection means of the spindle when the locking element is in the release position in order to allow a rotational movement of the spindle, and the at least one interlocking connection means of the locking element being engaged with the at least one mating interlocking connection means of the spindle when the locking element is in the locking position in order to prevent a rotational movement of the spindle and to allow the tool to be exchanged from the tool holder.

BACKGROUND

During use of a machine tool, for example a drywall cut-out tool, it is possible for the tool to encounter a current-carrying line.

In order to protect an operator in such a situation from electric shock when handling the machine tool, the machine tool housing is electrically shielded from the spindle at least in the regions which are touched or at least can be touched by an operator while using the machine tool. This electrical insulation can be achieved by supporting the spindle using electrically insulated mountings.

When exchanging the tool, however, the spindle has to be fixed by the operator, because otherwise the tool cannot be decoupled from the spindle. In order to fix the spindle, a locking device is provided which is to be actuated by the operator and comprises a locking element. In a machine tool of the type mentioned above, the locking element is usually made of metal for stability reasons and is therefore electrically conductive.

If the tool is still in contact with the electrical line and at the same time the locking device is actuated, the locking element comes into contact with the now electrically charged spindle, as a result of which the electrically insulating mounting of the spindle is bypassed by the machine tool housing. Since the locking device is mounted in the machine tool housing, the machine tool housing can also be electrically charged via the locking element and the spindle. There is then a risk of electric shock to the operator. A situation of this kind can arise when, for example, the tool comes into contact with a current-carrying line during machining of a wall and the rotating tool becomes so tightly entangled with the power line that releasing (e.g. pulling the tool out from the wall) is no longer possible. In this case, it is not impossible for an operator, as described above, to actuate the locking device with the intention of releasing the machine tool from the stuck tool.

SUMMARY OF THE INVENTION

The problem addressed by the present invention is that of providing a machine tool of the type mentioned at the outset in which there is no danger of electric shock to an operator when exchanging the tool.

In order to solve this problem, the present invention proposes providing the locking device of the machine tool with an electrically insulating mounting device for mounting the locking element in the machine tool housing in order to electrically insulate the locking element from the machine tool housing.

According to the invention, the mounting device which mounts the locking element prevents the spindle from discharging via the locking element of the locking device, via the machine tool housing and ultimately via the operator. The mounting device can be electrically insulated by the mounting device being made of an electrically insulating material, such as a plastics material. It is also possible for the mounting device to be surrounded by an electrically insulating coating or sleeve.

According to a preferred embodiment, the mounting device is a sleeve through which the locking element extends. The sleeve can support the locking element substantially parallel to the axis of rotation of the spindle and guide the locking element so to be linearly movable substantially perpendicularly to the axis of rotation. The mounting device is preferably held in the machine tool housing such that contact between the locking element and the machine tool housing is prevented.

In order to facilitate installing the sleeve in the machine tool housing, the sleeve can have a thread on an outer face. According to a further advantageous embodiment, a rib structure can also be provided instead of a thread. The rib structure allows the sleeve to be securely held in the machine tool housing.

The locking element is preferably a rod or pin which is held in the sleeve. One end of the rod can form the locking end and the locking end can in turn form the at least one interlocking connection means. Correspondingly, the spindle can have at least one recess in a circumferential wall, the at least one recess then forming the at least one mating interlocking connection means.

In order to actuate the locking device, the locking device preferably comprises an electrically insulating actuation element which is arranged on the actuation end of the locking element. The actuation element can consist of electrically insulating material, e.g. plastics material, or have a corresponding coating or sleeve. The locking element is preferably only supported in the machine tool housing by the actuation element and the mounting device.

According to a preferred embodiment, the locking device comprises a spring element which preloads the locking element into the release position. The locking element is therefore in the release position when the locking device is unactuated. An operator can move the locking element into the locking position counter to the action of the spring element, for example by pressing the actuation element in the direction of the spindle. If the operator releases the locking device or the actuation element, the locking element reassumes the release position under the action of the spring element.

The spring element can be arranged between the mounting device and the actuation end. For example, the spring element can be arranged such that one end of the spring element is supported on the mounting device or the sleeve and the other end is supported on the actuation element. For example, the spring element can be a spiral spring which is arranged around the locking element.

According to a preferred embodiment, the machine tool is a slitting tool, in particular a drywall cut-out tool.

BRIEF DESCRIPTION OF THE DRAWINGS

Further advantages can be found in the following description of the drawings. Various embodiments of the present invention are shown in the drawings. The drawings, the description and the claims contain numerous features in combination. A person skilled in the art will expediently also consider the features individually and combine them to form meaningful further combinations.

In the drawings, identical and equivalent components are provided with the same reference signs.

In the drawings:

FIG. 1 shows a detail of a machine tool according to the invention comprising a locking device;

FIG. 2 shows the spindle of the machine tool from FIG. 1;

FIG. 3 shows the locking device of the machine tool from FIG. 1;

FIG. 4 shows the sleeve of the locking device from FIG. 2;

FIG. 5 shows the rod of the locking device from FIG. 2; and

FIG. 6 shows the pusher of the locking device from FIG. 2.

DETAILED DESCRIPTION

Figure 1:
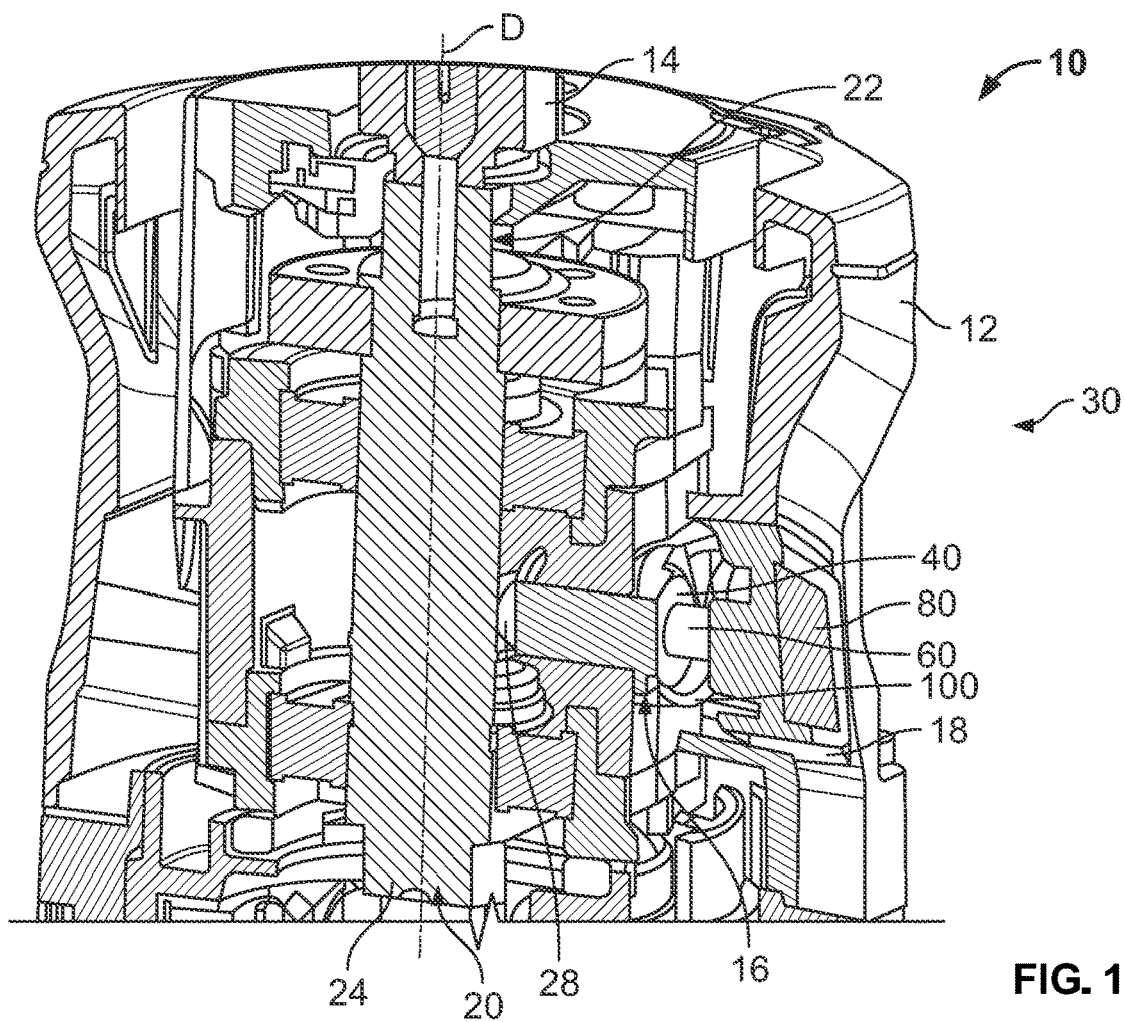

FIG. 1 shows a detail of a machine tool 10 according to the invention. The machine tool 10 comprises a machine tool housing 12, a spindle 20 which is rotatably mounted in the machine tool housing 12 and has a holding end 22 and a drive end 24, a tool holder 14 coupled to the spindle 20, and a locking device 30 mounted in the machine tool housing 12.

The drive end 24 of the spindle 20 is connected to a drive device in order to rotate a tool held by the tool holder 14 about an axis of rotation D.

Figure 2:
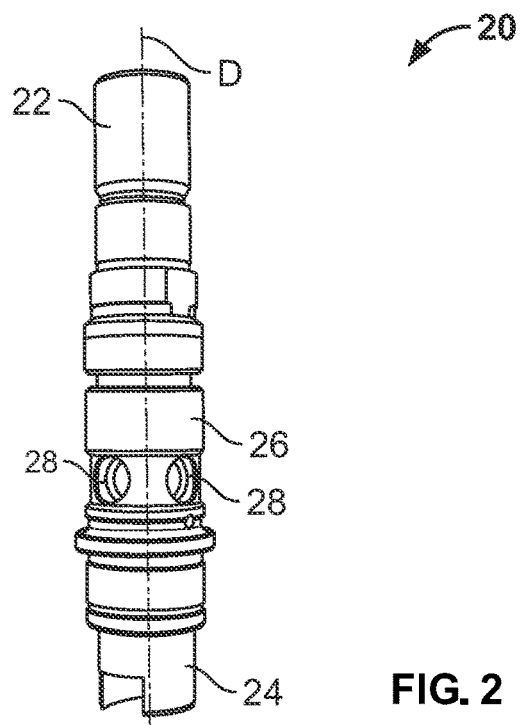

With reference to FIG. 2, the spindle 20 has, on its circumferential wall 26, four circular recesses 28 (only two of which can be seen in FIG. 2) which are arranged annularly about the axis of rotation D of the spindle 20 so as to be equidistant from one another in the circumferential direction. However, the spindle 20 can also have one, two or a different number of recesses 28. Each one of the recesses 28 can cooperate with the locking device 30.

Figure 3:
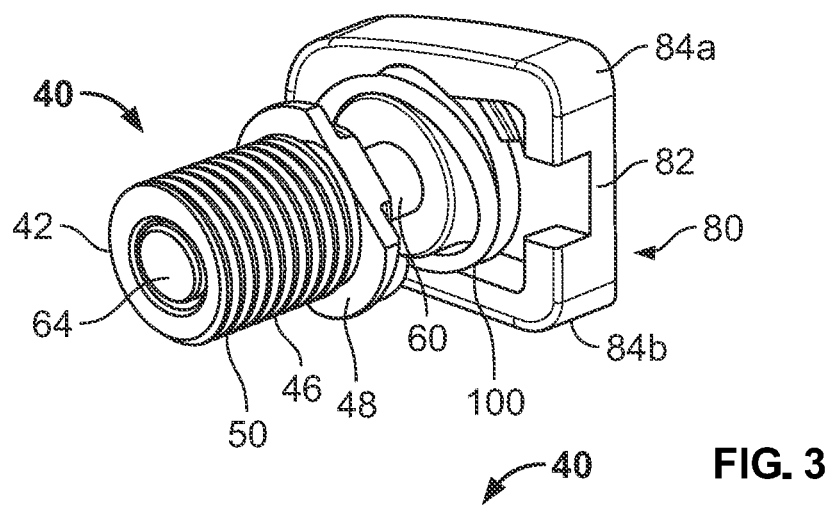
Figure 5:
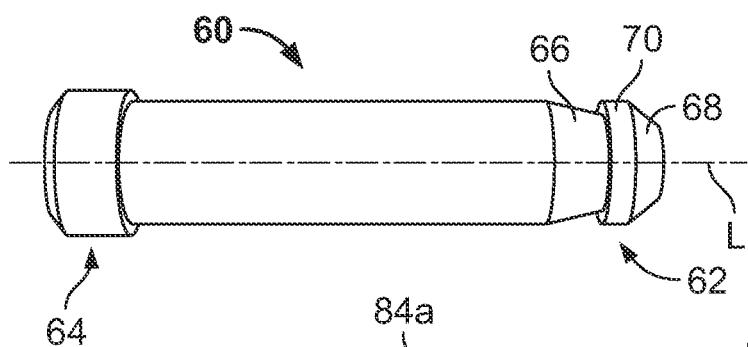

With reference to FIGS. 1 and 3, the locking device 30 has a mounting device in the form of a sleeve 40 and a locking element in the form of a substantially cylindrical rod 60, which locking element extends through the sleeve 40. The rod 60 has an actuation end 62 and a locking end 64 opposite the actuation end 62 (FIG. 5). The locking device 30 also comprises an actuation element in the form of a substantially rectangular pusher 80, which actuation element is connected to the actuation end 62, and a spring element in the form of a spiral spring 100, which spring element is arranged between the sleeve 40 and the pusher 80.

Figure 4:
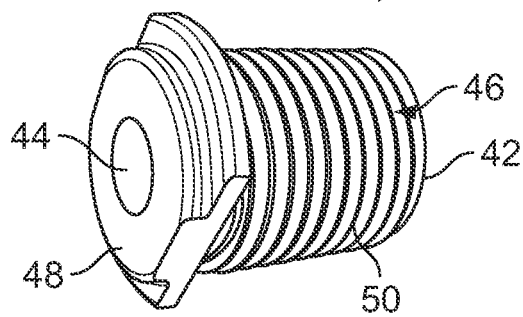

As is apparent from FIG. 1, the sleeve 40 is inserted into a first opening 16 in the machine tool housing 12. The sleeve 40 shown in greater detail in FIG. 4 has a substantially hollow-cylindrical body 42 having a through-opening 44, and a support wall 48 which projects radially beyond an outer face 46 of the body 42. The outer face 46 comprises a thread 50 in order to allow secure installation into the opening 16. The sleeve 40 is preferably made of an electrically insulating plastics material.

The support wall 48 has two opposing planar surfaces. These planar surfaces allow the engagement of a hexagonal tool or wrench in order to easily install or remove the sleeve 40 in the machine tool housing 12 from the outside.

The rod 60 shown individually in FIG. 5 has a longitudinal axis L which extends substantially perpendicularly to the axis of rotation D (FIG. 1). The rod 60 is held in the through-opening 44 in the sleeve 40 so as to be linearly movable (FIG. 3). For reasons of stability, the rod 60 is preferably made of metal and is therefore electrically conductive.

At its actuation end 62, the rod 60 has a conical first portion 66 and a conical second portion 68 which are arranged one next to the other in the longitudinal direction L and each taper toward the actuation end 62. A shoulder region 70 is arranged between the first portion 66 and the second portion 68, which shoulder region projects in the radial direction beyond the end of the first portion 66 that is closer to the actuation end 62. This embodiment of the actuation end 62 of the rod 60 is used to couple to the pusher 80. The locking end 64 has an enlarged cross section by comparison with the rest of the rod 60.

FIG. 1 shows that the pusher 80 is held in a second opening 18 in the machine tool housing 12. Like the sleeve 40, the pusher 80 is preferably also made of an electrically insulating plastics material. The pusher 80 can be seen in greater detail in FIGS. 3 and 6 and has an outer wall 82 which is flush with the machine tool housing 12. An upper circumferential wall 84a, a lower circumferential wall 84b and a hollow-cylindrical raised portion 86 arranged between the upper circumferential wall 84a and the lower circumferential wall 84b extend from the outer wall 82 of the pusher 80 in the direction of the spindle 20. The raised portion 86 has a lateral wall 88 and a top wall 90 spaced apart from the outer wall 82. Furthermore, the pusher 80 also has a slot on the outer wall 82, through which slot the pusher 80 can be levered from the rod by means of a flat tool (e.g. a flat-blade screwdriver). The slot is not shown in the figures.

The top wall 90 has an opening 92 into which the actuation end 62 of the rod 60 enters. The shape of the inner face of the opening 92 and the shape of the first and second portions 66, 68 are matched to one another. If the rod 60 is connected to the pusher 80, the shoulder region 70 engages behind the top wall 90 in the region of the opening 92 and the second portion 68 abuts the outer wall 82 of the pusher 80.

Figure 6:
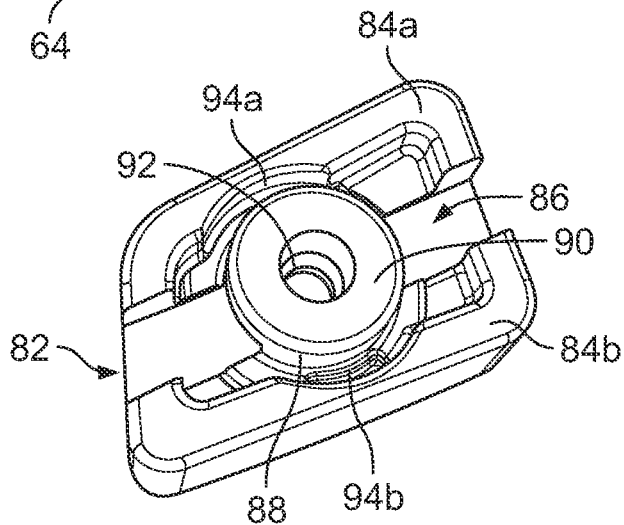

With reference to FIGS. 1 and 3, one end of the spiral spring 100 is arranged around the raised portion 86 of the pusher 80. FIG. 6 shows that an upper channel portion 94a is formed between the raised portion 86 and the upper circumferential wall 84a and a lower channel portion 94b is formed between the raised portion 86 and the lower circumferential wall 84b, which channel portions hold one end of the spiral spring 100. One end of the spiral spring 100 is therefore supported on the outer wall 82 of the pusher 80 and the other end of the spiral spring 100 surrounds the through-opening 44 in the sleeve 40 and abuts the support wall 48 of the sleeve 40.

The rod 60 can assume a release position and a locking position. When the pusher 80 is not actuated, the locking device 30 is in the starting position shown in FIG. 1 and the rod 60 is in its release position in which the locking end 64 of the rod 60 is disengaged from the recesses 28 of the spindle 20 such that the spindle 20 can rotate freely about the axis of rotation D. When the locking device 30 is actuated, the pusher 80 and the rod 60 coupled to the pusher 80 are moved in the direction of the spindle 20 until the locking end 64 of the rod 60 engages in one of the recesses 28. If necessary, an operator has to first bring the spindle 20 into a corresponding rotational position relative to the rod 60. If the rod 60 and a recess 28 are engaged, the locking position of the rod 60 is achieved and a rotational movement of the spindle 20 is not possible. The operator can then release the tool coupled to the spindle 20 from the spindle 20 and replace said tool with another tool, for example. If the spindle 20 is electrically charged, the charge cannot discharge via the operator due to the rod 60 being mounted in the electrically insulating sleeve 40 and due to the pusher 80 which is also electrically insulating. There is therefore no risk of electric shock.

By moving the pusher 80 together with the rod 60 relative to the sleeve 40, the spiral spring 100 arranged between the pusher 80 and the sleeve 40 is compressed. If the pusher 80 is released by the operator, the locking device 30 reassumes the starting position shown in FIG. 1, in which the rod 60 is in its release position.

LIST OF REFERENCE NUMBERS

D axis of rotation
L longitudinal axis
10 machine tool
12 machine tool housing
14 tool holder
16 first opening
18 second opening
20 spindle
22 holding end
24 drive end
26 circumferential wall
28 recesses
30 locking device
40 mounting device/sleeve
42 body
44 through-opening
46 outer face
48 support wall
50 thread
60 locking element/rod
62 actuation end
64 locking end
66 first portion
68 second portion
70 shoulder
80 actuation element/pusher
82 outer wall
84a, b upper and lower circumferential wall
86 raised portion
88 lateral wall
90 top wall
92 opening
94a, b upper and lower channel portion
100 spring

What is claimed is:
1. A machine tool comprising:
a tool holder;
a machine tool housing;
a spindle rotatably mounted in the machine tool housing and having a drive end and a holding end, the drive end being connected to a drive for rotating the spindle about an axis of rotation and the holding end being coupled to the tool holder; and
a locking device mounted in the machine tool housing and having a locking element having a locking end for interacting with the spindle and an actuation end, the locking element being reversibly movable between a release position and a locking position,
the locking end of the locking element having at least one interlocking connector and the spindle having at least one mating interlocking connector, the at least one interlocking connector being disengaged from the at least one mating interlocking connector of the spindle when the locking element is in the release position in order to allow a rotational movement of the spindle, and the at least one interlocking connector of the locking element being engaged with the at least one mating interlocking connector of the spindle when the locking element is in the locking position in order to prevent a rotational movement of the spindle and to allow the tool to be exchanged from the tool holder;
the locking device further including an electrically insulating mounting device for mounting the locking element in the machine tool housing in order to electrically insulate the locking element from the machine tool housing.

2. The machine tool as recited in claim 1 wherein the mounting device is a sleeve through which the locking element extends, the mounting device mounting the locking element in a linearly movable fashion.

3. The machine tool as recited in claim 2 wherein the sleeve has an outer face including a thread.

4. The machine tool as recited in claim 2 wherein the sleeve is made of an electrically insulating plastic.

5. The machine tool as recited in claim 1 wherein the locking element is a rod and the locking end of the rod forms the at least one interlocking connector.

6. The machine tool as recited in claim 5 wherein at an actuation end the rod has a conical first portion and a conical second portion arranged next to each other in a longitudinal direction.

7. The machine tool as recited in claim 6 wherein each of the first and second portions taper toward the actuation end.

8. The machine tool as recited in claim 6 wherein a shoulder region is arranged between the first portion and the second portion, the shoulder region projecting in a radial direction beyond an end of the first portion closer to the actuation end.

9. The machine tool as recited in claim 5 wherein the rod is coupled to a pusher.

10. The machine tool as recited in claim 9 wherein the rod is made of metal and the pusher is made of an electrically insulating plastic.

11. The machine tool as recited on claim 1 wherein the spindle has at least one recess in a circumferential wall and the at least one recess forms the mating interlocking connector.

12. The machine tool as recited on claim 1 wherein the locking device further includes an electrically insulating actuator for actuating the locking device, the actuator being arranged on the actuation end of the locking element.

13. The machine tool as recited in claim 12 wherein the actuator is made of plastic.

14. The machine tool as recited in claim 1 wherein the locking device further includes a spring preloading the locking element into the release position.

15. The machine tool as recited in claim 14 wherein the spring is a spiral spring.

16. The machine tool as recited in claim 14 wherein the spring is arranged between the mounting device and the actuation end.

17. A slitting tool comprising the machine tool as recited in claim 1.

18. A drywall cut-out tool comprising the machine tool as recited in claim 1.

19. The machine tool as recited in claim 1 wherein the locking element does not directly contact the machine housing.

* * * * *